(12) United States Patent
Morioka et al.

(10) Patent No.: US 8,932,387 B2
(45) Date of Patent: Jan. 13, 2015

(54) ENRICHMENT SYSTEM FOR COMBUSTIBLE GAS

(75) Inventors: Hajime Morioka, Kobe (JP); Takahisa Utaki, Kyotanabe (JP)

(73) Assignee: Osaka Gas Co., Ltd., Osaka (JP)

( * ) Notice: Subject to any disclaimer, the term of this patent is extended or adjusted under 35 U.S.C. 154(b) by 237 days.

(21) Appl. No.: 13/575,127

(22) PCT Filed: Jan. 24, 2011

(86) PCT No.: PCT/JP2011/051240
§ 371 (c)(1),
(2), (4) Date: Oct. 11, 2012

(87) PCT Pub. No.: WO2011/093247
PCT Pub. Date: Aug. 4, 2011

(65) Prior Publication Data
US 2013/0205665 A1 Aug. 15, 2013

(30) Foreign Application Priority Data
Jan. 26, 2010 (JP) .................. 2010-014534

(51) Int. Cl.
*C10L 3/10* (2006.01)
*B01D 53/04* (2006.01)
(Continued)

(52) U.S. Cl.
CPC .............. *C10K 1/22* (2013.01); *B01D 53/0476* (2013.01); *C10L 3/10* (2013.01); *B01D 2253/102* (2013.01); *B01D 2253/106* (2013.01); *B01D 2253/108* (2013.01); *B01D 2253/20* (2013.01); *B01D 2256/245* (2013.01); *B01D 2257/102* (2013.01); *B01D 2257/104* (2013.01);
(Continued)

(58) Field of Classification Search
USPC ........ 96/109, 111, 113, 121; 95/8, 11, 12, 19, 95/21, 22, 143–146; 585/820, 821
See application file for complete search history.

(56) References Cited

U.S. PATENT DOCUMENTS 4,305,734 A 12/1981 McGill
4,521,221 A 6/1985 Richter et al.
(Continued)

FOREIGN PATENT DOCUMENTS

JP 58198591 A 11/1983
JP 59157036 A 9/1984
(Continued)

*Primary Examiner* — Frank Lawrence
(74) *Attorney, Agent, or Firm* — The Webb Law Firm (57) ABSTRACT

A combustible gas enrichment system includes an adsorption unit charged therein with an adsorbent for selectively adsorbing a combustible gas, a source gas feeding means capable of feeding source gas containing the combustible gas into the adsorption unit from the outside, a suctioning means capable of suctioning the gas from the inside of the adsorption unit and a controlling means for executing an adsorption process for feeding the source gas into the adsorption unit for adsorption of the combustible gas to the adsorbent and a desorption process for desorbing the combustible gas from the adsorbent under the suction force of the suctioning means after the adsorption process and taking the desorbed combustible gas to the outside. The controlling means operates the suctioning means such that the suction force of the suctioning means when no desorption process is effected is smaller than the suction force when the desorption process is effected.

5 Claims, 4 Drawing Sheets

(51) Int. Cl.
*C10K 1/22* (2006.01)
*B01D 53/047* (2006.01)

(52) U.S. Cl.
CPC .............. *B01D 2259/40007* (2013.01); *B01D 2259/40071* (2013.01); *B01D 2259/403* (2013.01)
USPC .................. 96/111; 96/113; 96/121; 585/821

(56) References Cited

U.S. PATENT DOCUMENTS

| | | | |
|---|---|---|---|
| 5,733,359 A | | 3/1998 | Doong et al. |
| 5,951,741 A | * | 9/1999 | Dahl et al. ........................ 95/11 |
| 8,070,864 B2 | * | 12/2011 | Uchiyama et al. .............. 96/109 |
| 8,545,603 B2 | * | 10/2013 | Maheshwary et al. ............ 95/96 |
| 8,623,118 B2 | * | 1/2014 | Belanger et al. .................. 95/26 |

FOREIGN PATENT DOCUMENTS

| | | |
|---|---|---|
| JP | 60193520 A | 10/1985 |
| JP | 60262890 A | 12/1985 |
| JP | 61136419 A | 6/1986 |
| JP | 6365929 A | 3/1988 |
| JP | 3127604 A | 5/1991 |
| JP | 3290301 A | 12/1991 |
| JP | 6254333 A | 9/1994 |
| JP | 72205 B2 | 1/1995 |
| JP | 780231 A | 3/1995 |
| JP | 1043535 A | 2/1998 |
| JP | 11267439 A | 10/1999 |
| JP | 2001179030 A | 7/2001 |
| JP | 2002361022 A | 12/2002 |
| JP | 2009220004 A | 10/2009 |
| WO | 2008053680 A1 | 5/2008 |

* cited by examiner

ENRICHMENT SYSTEM FOR COMBUSTIBLE GAS

TECHNICAL FIELD

The present invention relates to a combustible gas enrichment system for feeding a source gas containing a combustible gas and air to an adsorption unit charged therein with an adsorbent for selectively adsorbing the combustible gas for selective adsorption and enrichment of the combustible gas.

BACKGROUND ART

For effective utilization of a combustible gas as a fuel or the like, it is necessary to enrich the combustible gas to an appropriate range by separating gas such as air from the source gas containing this combustible gas. Various apparatuses and methods have been proposed for enrichment of such combustible gas. For instance, Patent Document 1 discloses an invention in which a gas (the so-called coal mine gas) generated from a coal mine and containing methane gas as a combustible gas is employed as a source gas and air (containing mainly, nitrogen, oxygen and carbon dioxide) is separated from this source gas with using an adsorbent, thus enriching the methane gas for its utilization.

More particularly, the combustible gas enrichment system disclosed in Patent Document 1 includes an adsorption unit charged therein with an adsorbent for selectively adsorbing the combustible gas, a source gas feeding means capable of feeding source gas into an adsorption unit from the outside, and a suctioning means capable of suctioning the gas from the inside of the adsorption unit. And, the system effects an adsorption process for feeding the source gas into the adsorption unit by the source gas feeding means for adsorption of the combustible gas to the adsorbent and a desorption process for desorbing the combustible gas from the adsorbent under the suction force of the suctioning means after the adsorption process and taking the desorbed combustible gas to the outside. As the suctioning means described above, there is employed a vacuum pump device comprised of a pump and a drive motor for driving this pump.

PRIOR ART DOCUMENT

Patent Document

Patent Document 1: Japanese Unexamined Patent Application Publication No. 2009-220004

SUMMARY OF THE INVENTION

Problem to be Solved by Invention

For an operation of the combustible gas enrichment system, the suctioning means is needed only for the desorption process. Therefore, when the desorption process is not effected, operation of the suctioning means may be stopped for improvement in energy saving performance.

However, if start of operation and stop of operation of the suctioning means are effected in repetition for each execution of the desorption process, this may result in reduction in the service life of the suctioning means.

The present invention has been made in view of the above-described problem and its object is to provide a combustible gas enrichment system capable of improving energy saving performance with taking into consideration the service life of the suctioning means.

Means for Solving the Problem

For accomplishing the above-noted object, according to a characterizing feature of the combustible gas enrichment system relating to the present invention, the system comprises:

an adsorption unit charged therein with an adsorbent for selectively adsorbing a combustible gas;

a source gas feeding means capable of feeding source gas containing the combustible gas into the adsorption unit from the outside;

a suctioning means capable of suctioning the gas from the inside of the adsorption unit; and a controlling means for executing an adsorption process for feeding the source gas into the adsorption unit by the source gas feeding means for adsorption of the combustible gas to the adsorbent and a desorption process for desorbing the combustible gas from the adsorbent under the suction force of the suctioning means after the adsorption process and taking the desorbed combustible gas to the outside;

wherein the controlling means operates the suctioning means such that the suction force of the suctioning means when no desorption process is effected is smaller than the suction force of the suctioning means when the desorption process is effected.

With the above-described characterizing feature, the suctioning means is operated also when no desorption process is effected. Hence, the system avoids such mode of operation that start of operation and stop of operation of the suctioning means are effected in repetition for each execution of the desorption process. Therefore, the service life of the suctioning means may be extended in comparison with use of the mode of operation that start of operation and stop of operation of the suctioning means are effected in repetition for each execution of the desorption process.

In addition, as the controlling means operates the suctioning means such that the suction force of the suctioning means when no desorption process is effected is smaller than the suction force of the suctioning means when the desorption process is effected, the energy required for operating the suctioning means when no desorption process is effected is rendered smaller than the suction force of the suctioning means when the desorption process is effected. That is, the energy saving performance of the combustible gas enrichment system can be improved.

Therefore, it is possible to provide a combustible gas enrichment system capable of improving energy saving performance with taking into consideration the service life of the suctioning means.

According to a further characterizing feature of a combustible gas enrichment system relating to the present invention, the system includes one said adsorption unit; and the controlling means operates the suctioning means such that the suction force of the suctioning means when the adsorption process is effected is smaller than the suction force of the suctioning means when the desorption process is effected.

Since one adsorption unit cannot be involved in an adsorption process and a desorption process simultaneously, there is no need to keep the suction force of the suctioning means large when an adsorption process is being effected.

With the above-described characterizing arrangement, the controlling means operates the suctioning means such that the suction force of the suctioning means when the adsorption process is effected is smaller than the suction force of the suctioning means when the desorption process is effected. Hence, the consumed energy of the suctioning means can be small during execution of the adsorption process.

According to a still further characterizing feature of a combustible gas enrichment system relating to the present invention, the system includes a plurality of said adsorption units;

said suctioning means is used commonly for suctioning the insides of the plurality of adsorption units; and the controlling means operates the suctioning means such that the suction force of the suctioning means when no adsorption process is effected in any of the adsorption units is smaller than the suction force of the suctioning means when the desorption process is effected.

With the above-described characterizing arrangement, as one suctioning means is provided to be commonly used for suctioning of the insides of the plurality of adsorption units, the number of the suctioning means can be small. In addition, when the adsorption process and the desorption process are effected in a plurality of adsorption units with using one suctioning means, the suctioning means is operated such that the suction force of the suctioning means when no adsorption process is effected in any of the adsorption units is smaller than the suction force of the suctioning means when the desorption process is effected. With this, the energy required for operating the suctioning means when none of the plurality of adsorption units are involved in the desorption process can be small.

According to a still further characterizing feature of a combustible gas enrichment system relating to the present invention, the controlling means is capable of effecting, in addition to the adsorption process and the desorption process, a pressure equalization process for equalizing the pressure inside one of the plurality of adsorption units after execution of the adsorption process therein with the pressure inside a further one of the plurality of adsorption units after execution of the desorption process therein by establishing communication between the inside of the one adsorption unit and the inside of said further adsorption unit via a communicating passage; and the controlling means operates the suctioning means such that the suction force of the suctioning means when the pressure equalization process is effected is smaller than the suction force of the suctioning means when the desorption process is effected.

With the above-described characterizing arrangement, as the controlling means operates the suctioning means such that the suction force of the suctioning means when the pressure equalization process is effected is smaller than the suction force of the suctioning means when the desorption process is effected, the energy required for operating the suctioning means when the pressure equalization process is effected can be small.

According to a still further characterizing feature of a combustible gas enrichment system relating to the present invention, the controlling means operates the suctioning means such that the suction force of the suctioning means at an early stage in the desorption process is greater than the suction force of the suctioning at subsequent stage in the desorption process.

At the early stage in the desorption process, the amount of the combustible gas adsorbed to the adsorbent of the adsorption unit is still large. Hence, with a greater suction force of the suctioning means, a large amount of combustible gas can be desorbed. On the other hand, at the subsequent stage in the desorption process, the amount of the combustible gas adsorbed to the adsorbent of the adsorption unit becomes smaller. Hence, even if the suction force of the suctioning means were increased, only a relatively small amount of combustible gas could be desorbed.

With the above-described characterizing arrangement, since the controlling means operates the suctioning means such that the suction force of the suctioning means at an early stage in the desorption process is greater than the suction force of the suctioning at subsequent stage in the desorption process, a relatively large amount of combustible gas can be desorbed effectively at the early stage in the desorption process. Also, at the subsequent stage, the combustible gas can be desorbed effectively, with keeping the energy consumption small.

According to a still further characterizing feature of a combustible gas enrichment system relating to the present invention, the suctioning means includes a pump and a drive motor for driving the pump; and the controlling means adjusts the suction force of the suctioning means by controlling the rotational speed of the drive motor through inverter control.

With the above-described characterizing arrangement, as the controlling means controls the rotational speed of the drive motor through inverter control, the controlling means can adjust the suction force of the suctioning means easily.

MODES OF EMBODYING THE INVENTION

First Embodiment

Next, with reference to the accompanying drawings, a combustible gas enrichment system according to a first embodiment will be described.

Figure 1:
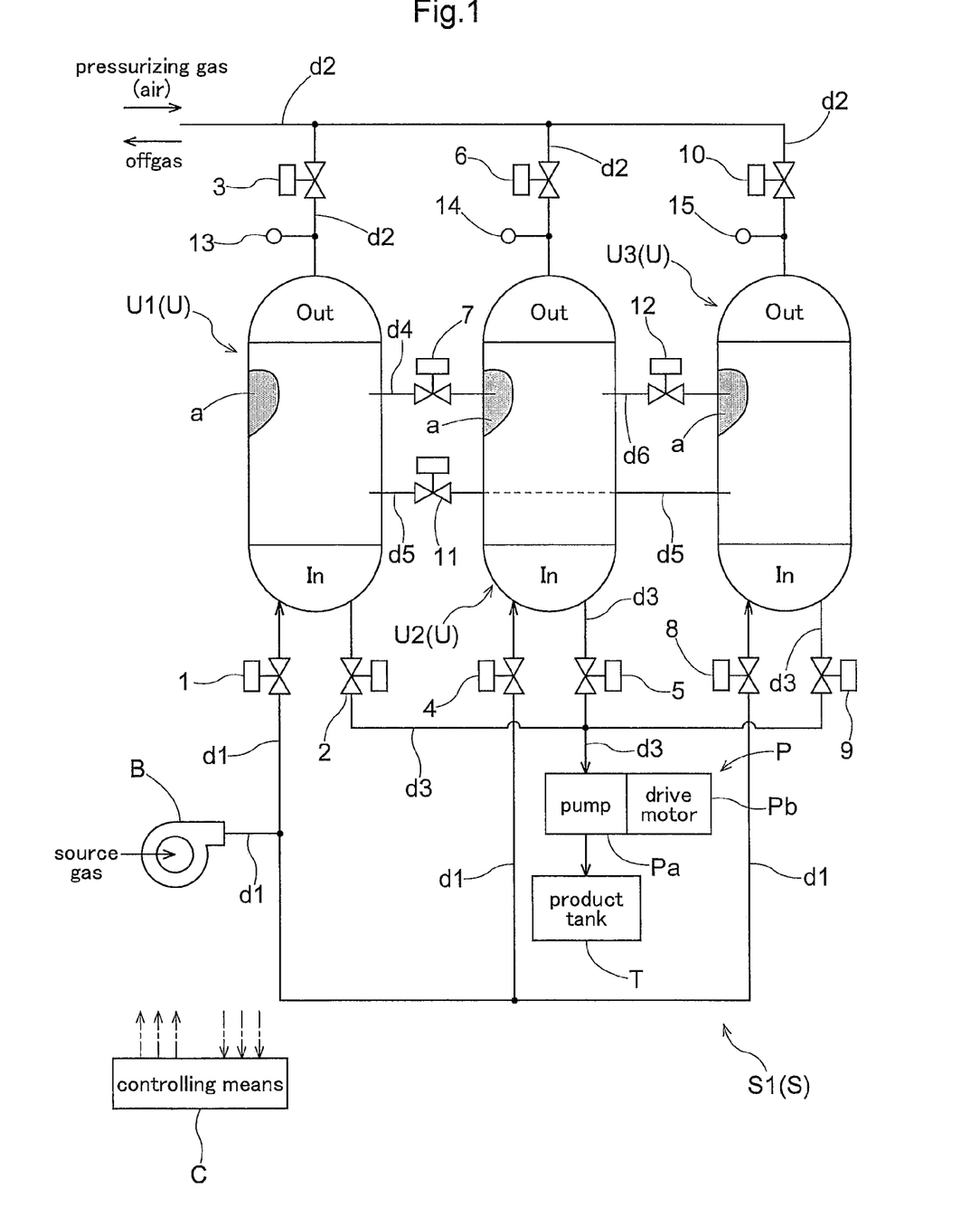
FIG. 1 is a block diagram for explaining the configuration of a combustible gas enrichment system according to a first embodiment.

FIG. 1 is a block diagram for explaining the configuration of the combustible gas enrichment system according to the first embodiment. The enrichment system S1 (S) includes adsorption units U (U1, U2, U3), a blower B as a source gas feeding means, a vacuum pump device P as a suctioning means and a controlling means C.

The respective adsorption units U1, U2, U3 have an identical configuration provided as an adsorption tower charged therein with an amount of adsorbent (a) for selectively adsorbing the combustible gas. The adsorbent (a) is not particularly limited as long as it is capable of selectively adsorbing a combustible gas such as methane gas. As the adsorbent (a), it is advantageous to employ a methane gas adsorbent which is at least one selected from the group consisting of activated carbon, zeolite, silica gel, metallo-organic complex (copper fumarate, copper terephthalate, copper cyclohexanedicarboxylate, etc.) having an average pore diameter ranging from 4.5 to 15 Å as determined by the MP method and a methane adsorption amount of 20 Ncc/g or higher at the atmospheric pressure and 298K.

In addition to the above, the enrichment system S1 includes gas feeding passages (d1) for feeding the source gas to the adsorption units U1, U2, U3 and gas discharging passages (d2) for discharging residual gas ("offgas") after adsorption of the combustible gas by the adsorbent (a) with feeding of the gas from the gas feeding passages (d1) to the outside. The gas feeding passage (d1) connected to the adsorption unit U1 incorporates a gas feeding passage switching valve 1. The gas feeding passage (d1) connected to the adsorption unit U2 incorporates a gas feeding passage switching valve 4. The gas feeding passage (d1) connected to the adsorption unit U3 incorporates a gas feeding passage switching valve 8. The gas discharging passage (d2) connected to the adsorption unit U1 incorporates a gas discharging passage switching valve 3. The gas discharging passage (d2) connected to the adsorption unit U2 incorporates a gas discharging passage switching valve 6. The gas discharging passage (d2) connected to the adsorption unit U3 incorporates a gas discharging passage switching valve 10. Further, the enrichment system S1 includes gas collecting passages (d3) for collecting product gas from the respective adsorption units U1, U2, U3 into a product tank T. The gas collecting passage (d3) connected to the adsorption unit U1 incorporates a gas collecting passage switching valve 2. The gas collecting passage (d3) connected to the adsorption unit U2 incorporates a gas collecting passage switching valve 5. The gas collecting passage (d3) connected to the adsorption unit U3 incorporates a gas collecting passage switching valve 9.

In the present invention, the portion of the adsorption unit U under the condition of the source gas being fed into the adsorption unit U (U1, U2, U3) under operation will be referred to as "a gas inlet portion (In)", whereas the portion of the adsorption unit U under the condition of the offgas being discharged from the adsorption unit U will be referred to as "a gas outlet portion (Out)", hereinafter.

The gas discharging passages (d2) respectively incorporate gas sensors 13, 14, 15. Each gas sensor 13, 14, 15 is a device configured to detect the timing of the adsorbent (a) inside each adsorption unit U1, U2, U3 reaching its combustible gas adsorption capacity limit, that is, the timing of adsorption completion (break-through point). The controlling means C can recognize the timing when the combustible gas concentration (e.g. a methane gas concentration) detected by the gas sensor 13, 14, 15 reaches a predetermined concentration, that is, the timing when the adsorption capacity of the adsorbent (a) reaches its limit. As a result, the controlling means C can recognize the timing of stopping feeding of the source gas to the adsorption units U1, U2, U3.

The product tank T is not particularly limited as long as it is capable of storing the enriched, high-concentration combustible gas in a safe manner. An adsorption type gas tank can be used advantageously.

The blower B as the source gas feeding means is configured to be capable of feeding the source gas containing combustible gas into the adsorption unit U from the outside. The source gas G is a gas containing the combustible gas and air. Instead, this source gas G can be a coal mine gas containing methane and air, for instance. Further, the combustible gas is not particularly limited, as long as it is a gas having combustible property. For instance, it can be methane gas contained in a coal mine gas. Incidentally, a coal mine gas is a gas generated from a coal mine. Though will differ depending on the conditions, the coal mine gas typically contains methane gas by 20-40 Vol % approximately and air (containing mainly nitrogen gas and oxygen gas) by 60-80 Vol % approximately. The blower B suctions such source gas and feeds this source gas to the adsorption unit U substantially at the atmospheric pressure without any compression thereof.

The vacuum pump device P as a suctioning means includes a pump Pa and a drive motor Pb for driving this pump Pa and is configured as a device for depressurizing the inside of the adsorption unit U for suctioning gas from the inside. In the instant embodiment, for suctioning the insides of the respective adsorption units U1, U2, U3, one vacuum pump device P is provided for common use. As the pump Pa, a roots vacuum pump can be used for example. The suction force of the vacuum pump P (that is, the gas discharging velocity) increases in correspondence with increase in the rotational speed of the drive motor Pb. In the instant embodiment, the controlling means C is configured to adjust the suction force of the suctioning means by controlling the rotational speed of the drive motor Pb by the inverter control technique. With the action of the vacuum pump P incorporated in the gas collecting passage (d3), the combustible gas adsorbed to the adsorbent (a) can be collected under a pressurized state (with a positive pressure being present inside the product tank T) from the adsorption unit U into the product tank T.

The enrichment system S1 includes a communicating passage (d4) communicating between the inside of the adsorption unit U1 and the inside of the adsorption unit U2, a communicating passage (d5) communicating between the inside of the adsorption unit U1 and the inside of the adsorption unit U3 and a communicating passage (d6) communicating between the inside of the adsorption unit U2 and the inside of the adsorption unit U3. And, the communicating passage (d4) incorporates a communicating passage switching valve 7, the communicating passage (d5) incorporates a communicating passage switching valve 11 and the communicating passage (d6) incorporates a communicating passage switching valve 12.

In the instant embodiment, the controlling means C is comprised of a storage medium formed of a memory or the like, a CPU, a microcomputer having input/output sections, etc. And, as this computer executes a predetermined program, the operations of the blower B, the vacuum pump device P, the gas feeding passage switching valves 1, 4, 8, the gas discharging passage switching valves 3, 6, 10, the gas collecting passage switching valves 2, 5, 9, the communicating passage switching valves 7, 11, 12, etc. are controlled. In particular, the instant embodiment is characterized in that the controlling means C appropriately adjusts the suction force of the vacuum pump device P through the inverter control technique, with keeping the vacuum pump device P under operation.

Next, the operations of the enrichment system S1 according to the first embodiment will be explained.

As shown in Table 1, in the course of first through ninth stages, for the respective adsorption units U1, U2, U3, the controlling means C executes an adsorption process, a desorption process, a pressure equalization process, a pressurization process and a standby process. The adsorption process is a process in which the source gas is fed into the adsorption unit U by the blower B so as to cause the combustible gas to be adsorbed to the adsorbent (a) and the remaining gas is discharged to the gas discharging passage. The desorption process is a process in which after the adsorption process, the combustible gas is desorbed from the adsorbent (a) under the suction force of the vacuum pump and the desorbed gas is collected into the gas collecting passage. The pressure equalization process is a process in which the inside of an adsorption unit after its desorption process is communicated to the inside of a further adsorption unit after its adsorption process for equalizing the pressures of the insides of these adsorption units. The pressurization process is a process in which air (pressurizing gas) is introduced into the adsorption unit U for boosting the pressure therein to a near-atmospheric pressure.

Figure 2:
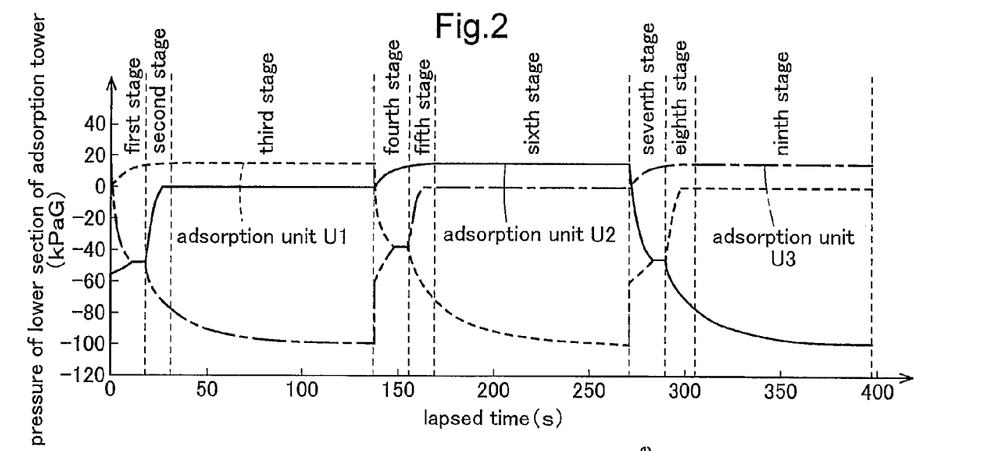
FIG. 2 is a graph showing the transition of the pressure inside each adsorption unit.

FIG. 2 is a graph showing transition of the pressure inside the respective adsorption unit U1, U2, U3 when the adsorption process, the desorption process, the pressure equalization process, the pressurization process and the standby process are executed for the respective adsorption units U1, U2, U3 in the course of the first through ninth stages.

source gas fed into the adsorption unit U1 and not adsorbed to the adsorbent (a), through the discharging passage (d2) to the space outside the adsorption unit U1. With this, it is possible to cause the methane gas as the combustible gas contained in the coal mine gas to be selectively adsorbed to the adsorbent (a) and also to prevent the precious methane gas from being released as it is into the offgas.

As shown in Table 1, in the first stage, the controlling means C causes none of the adsorption units U (U1, U2, U3)

TABLE 1

| | stage | | | | | | | | |
|---|---|---|---|---|---|---|---|---|---|
| | 1 | 2 | 3 | 4 | 5 | 6 | 7 | 8 | 9 |
| adsorption unit U1 | | adsorption | | pressure equalization | desorption | | pressure equalization | pressurization | standby |
| adsorption unit U2 | pressure equalization | pressurization | standby | | adsorption | | pressure equalization | desorption | |
| adsorption unit U3 | pressure equalization | desorption | | pressure equalization | pressurization | standby | | adsorption | |

TABLE 2

| | stage | | | | | | | | |
|---|---|---|---|---|---|---|---|---|---|
| | 1 | 2 | 3 | 4 | 5 | 6 | 7 | 8 | 9 |
| rotational speed of drive motor (rpm) | 600 | 1100 | 1100 | 600 | 1100 | 1100 | 600 | 1100 | 1100 |

In the adsorption unit U1, an adsorption process is executed in the first through third stages, a pressure equalization process is executed in the fourth stage, a desorption process is executed in the fifth to sixth stages. a pressure equalization process is executed in the seventh stage, a pressurization process is executed in the eighth stage, and a standby process is executed in the ninth stage. As the configurations of the respective adsorption units U1, U2, U3 are all the same, the procedures of the adsorption process, the pressure equalization process, the desorption process, the pressurization process and the standby process are substantially the same. That is, the adsorption unit U2 and the adsorption unit U3 differ from the adsorption unit U1 in the timings of the executions of the respective processes. Therefore, the following explanation will be made mainly on the procedure of the adsorption process, the pressure equalization process, the desorption process, the pressurization process and the standby process executed by the adsorption unit U1 in the course of the first through ninth stages, and the detailed explanations of the respective processes executed in the adsorption unit U2 and the adsorption unit U3 will be omitted.

[First Stage to Third Stage]

In the first through third stages, the controlling means C causes the adsorption unit U1 to execute an adsorption process. Specifically, the controlling means C opens the gas feeding passage switching valve 1 and the gas discharging passage switching valve 3 and closes the gas collecting passage switching valve 2, the communicating passage switching valve 7 and the communicating passage switching valve 11. In addition, the controlling means C activates the blower B for feeding the source gas through the gas feeding passage (d1) into the adsorption unit U1 for causing the combustible gas contained in the source gas to be adsorbed to the adsorbent (a) and also causing the offgas which is the portion of the source gas fed into the adsorption unit U1 and not adsorbed to the adsorbent (a), through the discharging passage (d2) to the space outside the adsorption unit U1. With this, it is possible to cause the methane gas as the combustible gas contained in the coal mine gas to be selectively adsorbed to the adsorbent (a) and also to prevent the precious methane gas from being released as it is into the offgas.

to execute a desorption process, but continuously operates the vacuum pump device P. In this, the controlling means C controls the vacuum pump device P in such a manner that the suction force of the vacuum pump device P when none of the adsorption units U (U1, U2, U3) are involved in a desorption process may be smaller than the suction force of the vacuum pump device P when a desorption process is effected. More particularly, the rotational speed is adjusted to a higher rotational speed for increasing the suction force and the rotational speed is adjusted to a lower rotational speed for decreasing the suction force. The controlling means C adjusts the suction force of the vacuum pump P by controlling the rotational speed of the drive motor Pb for the vacuum pump device P by the inverter control technique. In the instant embodiment, as shown in Table 2, the rotational speed of the drive motor Pb is controlled to 600 rpm. Incidentally, the controlling means C controls the rotational speed of the drive motor Pb to 1100 rpm when a desorption process is to be effected in any one of the adsorption units U (U1, U2, U3).

Thereafter, the controlling means C causes the gas sensor 13 to detect whether the concentration of the combustible gas in the offgas discharged to the gas discharging passage (d2) is higher than a predetermined concentration or not. If the detected combustible gas concentration is higher than the predetermined concentration, the controlling means C stops feeding of the source gas to the adsorption unit U1, thereby to complete the adsorption process. That is, the controlling means C interprets the combustible gas concentration detected in the gas discharging passage (d2) becoming higher than the predetermined concentration as indication of arrival of the adsorbent (a) at its adsorption limit, and then completes the adsorption process.

[Fourth Stage]

In the fourth stage, the controlling means C executes a pressure equalization process for equalizing the inside pressure of the adsorption unit U1 and the inside pressure of the adsorption unit U3. More particularly, the controlling means C opens the communicating passage switching valve 11 which is incorporated in the communicating passage (d5) communicating between the adsorption unit U1 and the adsorption unit U3 and closes the gas feeding passage switching valve 1, the gas collecting passage switching valve 2, the gas discharging passage switching valve 3 and the communicating passage switching valve 7.

As shown in FIG. 2, at the timing prior to the start of the fourth stage, the inside pressure of the adsorption unit U1 indicates a relatively high pressure as the pressure immediately after the adsorption process effected in the third stage, whereas the inside pressure of the adsorption unit U3 indicates a relatively low pressure as the pressure immediately after the desorption process effected in the third stage. And, in the fourth stage, the communicating passage switching valve 11 is opened for effecting the pressure equalization process, with which the inside pressure of the adsorption unit U1 is reduced whereas the inside pressure of the adsorption unit U3 is increased, so that these pressures are equalized to each other. As a result, in the adsorption unit U1, gas containing low-concentration combustible gas not adsorbed to the adsorbent (a) and remaining mainly in the form of gas phase will be diffused toward the adsorption unit U3. Therefore, it is possible to prevent this low-concentration combustible gas from being collected inadvertently toward the product tank T in the fifth stage subsequent thereto. Further, in the adsorption unit U3, the pressure inside this adsorption unit U3 can be raised to some extent in advance, prior to the pressurization process to be effected later.

As shown in Table 1, in the fourth stage, the controlling means C causes none of the adsorption units U (U1, U2, U3) to execute a desorption process, but continuously operates the vacuum pump device P. In this case, however, like the case of the first stage, the controlling means C controls the vacuum pump device P in such a manner that the suction force of the vacuum pump device P when none of the adsorption units U (U1, U2, U3) are involved in a desorption process may be smaller than the suction force of the vacuum pump device P when a desorption process is effected. In the fourth stage too, the controlling means C controls the rotational speed of the drive motor Pb to 600 rpm, as shown in Table 2.

[Fifth Though Sixth Stages]

In the fifth through sixth stages, the controlling means C causes the adsorption unit U1 to execute a desorption process. More particularly, the controlling means C closes the gas feeding passage switching valve 1, the gas discharging passage switching valve 3, the communicating passage switching valve 7 and the communicating passage switching valve 11 and opens the gas collecting passage switching valve 2 at the same time. In the fourth stage, the controlling means C increases the suction force of the vacuum pump device P (controls the rotational speed of the drive motor Pb to 1100 rpm), thereby to depressurize the inside of the adsorption unit U1 to a sub-atmospheric pressure for desorption of the adsorbed combustible gas from the adsorbent (a). As a result, the combustible gas is suctioned toward the gas collecting passage (d3) and collected and stored in the product tank T. After depressurizing the inside of the adsorption unit U1 to a predetermined pressure, the controlling means C closes the gas collecting passage switching valve 2 in order to stop collection of the combustible gas from the adsorption unit U1. As shown in FIG. 2, as the desorption of the combustible gas from the adsorbent (a) proceeds, the inside pressure of the adsorption unit U1 gradually decreases, so by monitoring the inside pressure of the adsorption unit U1, the controlling means C can judge completion timing of the desorption process.

[Seventh Stage]

In the seventh stage, the controlling means C causes the adsorption unit U1 to execute a pressure equalization process. In particular, the controlling means C executes a pressure equalization process for equalizing the inside pressure of the adsorption unit U1 and the inside pressure of the adsorption unit U2. Specifically, the controlling means closes the gas feeding passage switching valve 1, the gas collecting passage switching valve 2, the gas discharging passage switching valve 3 and the communicating passage switching valve 11 and opens the communicating passage switching valve 7 incorporated in the communicating passage (d4) communicating between the adsorption unit U1 and the adsorption unit U2.

As shown in FIG. 2, at the timing prior to the start of the seventh stage, the inside pressure of the adsorption unit U1 indicates a relatively low pressure as the pressure immediately after the desorption process effected in the sixth stage, whereas the inside pressure of the adsorption unit U3 indicates a relatively high pressure as the pressure immediately after the adsorption process effected in the sixth stage. And, in the seventh stage, the communicating passage switching valve 7 is opened for effecting the pressure equalization process, with which the inside pressure of the adsorption unit U1 is increased whereas the inside pressure of the adsorption unit U3 is reduced, so that these pressures are equalized to each other. As a result, in the adsorption unit U1, the pressure inside this adsorption unit U1 can be raised to some extent in advance, prior to the pressurization process to be effected later. Further, in the adsorption unit U2, gas containing low-concentration combustible gas not adsorbed to the adsorbent (a) and remaining mainly in the form of gas phase will be diffused toward the adsorption unit U1.

Like the pressure equalization process in the fourth stage described above, in the seventh stage, the controlling means C causes none of the adsorption units U (U1, U2, U3) to execute a desorption process, but continuously operates the vacuum pump device P. In this case, however, like the case of the fourth stage, the controlling means C controls the vacuum pump device P in such a manner that the suction force of the vacuum pump device P when none of the adsorption units U (U1, U2, U3) are involved in a desorption process may be smaller than the suction force of the vacuum pump device P when a desorption process is effected. In the seventh stage too, the controlling means C controls the rotational speed of the drive motor Pb to 600 rpm, as shown in Table 2.

[Eighth Stage]

In the eighth stage, the controlling means C causes the adsorption unit U1 to execute a pressurization process. Specifically, the controlling means C opens the gas discharging passage switching valve 3 and closes the gas feeding passage switching valve 1, the gas collecting passage switching valve 2, the communicating passage switching valve 7 and the communicating passage switching valve 11. With this, an amount of air (pressurizing gas) is introduced through the gas discharging passage switching valve 3 from the outside into the adsorption unit U1, whereby the pressure of the inside of the adsorption unit U1 is increased to a near-atmospheric pressure, so that adsorption of the combustible gas in the adsorption process to be effected subsequently may be facilitated.

[Ninth Stage]

In the ninth stage, the controlling means C causes the adsorption unit U1 to execute a standby process. Specifically, the controlling means C keeps open the gas feeding passage switching valve 1, the gas collecting passage switching valve 2, the gas discharging passage switching valve 3, the communicating passage switching valve 7 and the communicating passage switching valve 11 and waits for start of the subsequent adsorption process.

Figure 3:
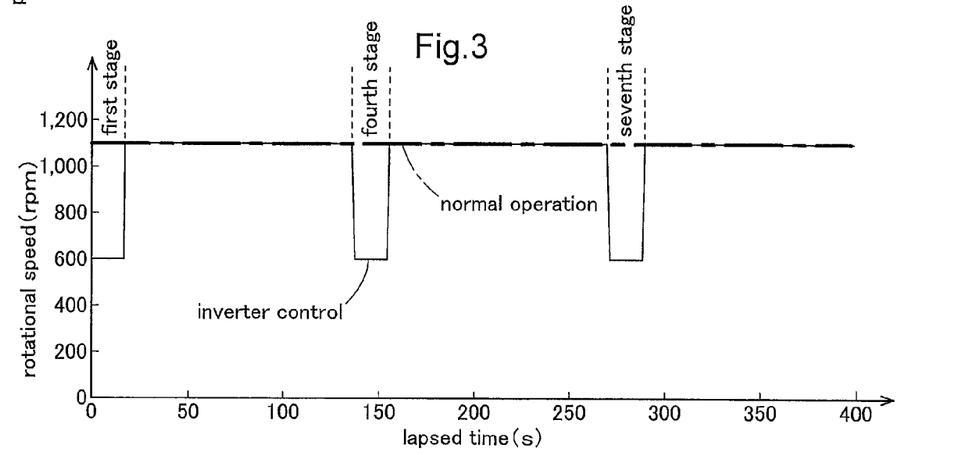
FIG. 3 is a graph showing the transition of the rotational speed of a drive motor of a vacuum pump device.
Figure 4:
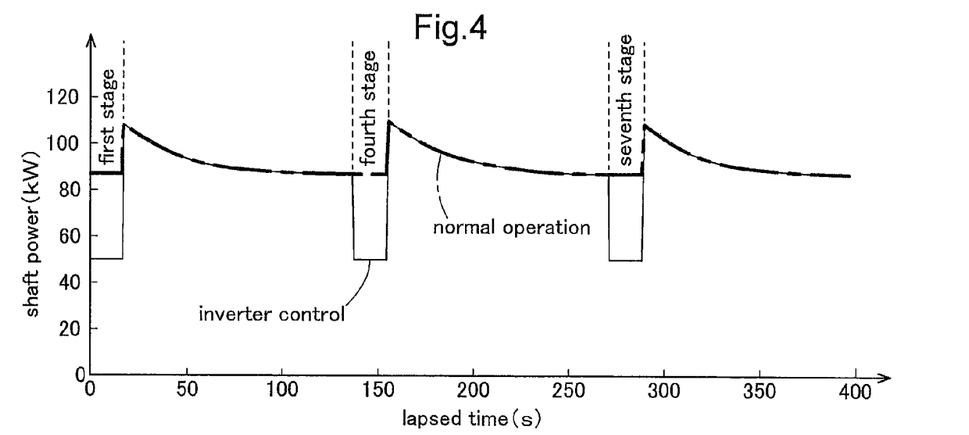
FIG. 4 is a graph showing the transition of the shaft output of the drive motor of the vacuum pump device.

As described above, with the enrichment system according to the instant embodiment, in the course of the first through ninth stages, the controlling means C controls the suction force of the vacuum pump device P such that the suction force of the vacuum pump device P when none of the plurality of adsorption units U (U1, U2, U3) are involved in a desorption process may be smaller than the suction force of the vacuum pump device P when a desorption process is effected. FIG. 3 is a graph showing transition of the rotational speed of the drive motor Pb of the vacuum pump device P in the course of the first though ninth stages. FIG. 4 is a graph showing transition of the shaft output of the drive motor Pb of the vacuum pump device P in the course of the first though ninth stages. In FIG. 3 and FIG. 4, there are shown also, as a comparison example, a case of normal operation wherein the rotational speed of the drive motor Pb of the vacuum pump device P is controlled to be constant in the course of the first through ninth stages.

Figure 5:
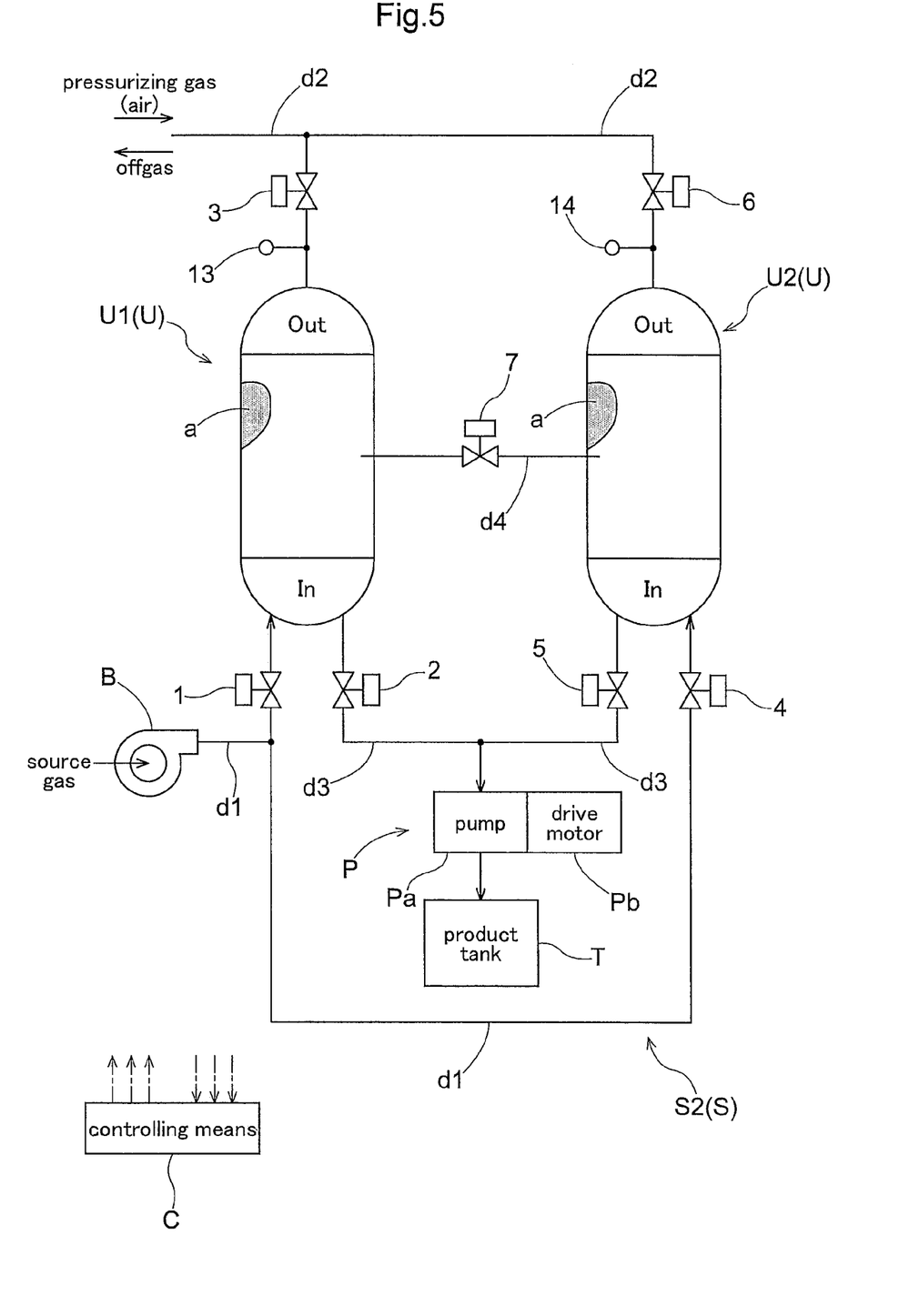
FIG. 5 is a block diagram for explaining the configuration of a combustible gas enrichment system according to a second embodiment.

As shown in FIG. 3 and FIG. 4, as the controlling means C controls the vacuum pump device P in such a manner that the suction force of the vacuum pump device P when none of the adsorption units U (U1, U2, U3) are involved in a desorption process may be smaller than the suction force of the vacuum pump device P when a desorption process is effected, it is possible to avoid unnecessary electric power consumption. For instance, as shown in FIG. 4, the average power consumption in the course of the first through ninth stages is about 86 kW in case the inverter control according to the present invention is implemented for the drive motor Pb included in the single vacuum pump device P, whereas the power consumption is about 91 kW in the case of the comparison example in which the normal operation of driving the drive motor Pb at a fixed rotational speed. Consequently, with use of the enrichment system S1 according to the present invention, about 5 kWh of electric power can be saved. Further, in case a plurality of vacuum pump devices P are provided, the amount of electric power that can be saved will increase in correspondence with the number of the pump devices P.

remaining gas (offgas) after adsorption of the combustible gas on the adsorbent (a) with the gas being fed from the gas feeding passages (d1). The gas feeding passage (d1) connected to the adsorption unit U1 incorporates a gas feeding passage switching valve 1 and the gas feeding passage (d1) connected to the adsorption unit U2 incorporates a gas feeding passage switching valve 4. The gas discharging passage (d2) connected to the adsorption unit U1 incorporates a gas discharging passage switching valve 3 and the gas discharging passage (d2) connected to the adsorption unit U2 incorporates a gas discharging passage switching valve 6. Further, the enrichment system S2 includes gas collecting passages (d3) for collecting product gas from the respective adsorption units U1, U2 into a product tank T. The gas collecting passage (d3) connected to the adsorption unit U1 incorporates a gas collecting passage switching valve 2. The gas collecting passage (d3) connected to the adsorption unit U2 incorporates a gas collecting passage switching valve 5.

The enrichment system S2 according to the second embodiment includes a communicating passage (d4) capable of communicating the inside of the adsorption unit U1 to the inside of the adsorption unit U2. The communicating passage (d4) incorporates a communicating passage switching valve 7. When the communicating passage switching valve 7 is opened, the pressure of the inside of the adsorption unit U1 and the pressure of the inside of the adsorption unit U2 are equalized to each other.

Next, the operations of the enrichment system S2 according to the second embodiment will be explained.

The controlling means C, as shown in Table 3 below, executes an adsorption process, a desorption process, a pressure equalization process and a pressurization process for the respective adsorption units U1, U1 in the course of the first through sixth stages.

TABLE 3

| | stage | | | | | |
|---|---|---|---|---|---|---|
| | 1 | 2 | 3 | 4 | 5 | 6 |
| adsorption unit U1 | adsorption | pressure equalization | desorption | | pressure equalization | pressurization |
| adsorption unit U2 | desorption | pressure equalization | pressurization | adsorption | pressure equalization | desorption |

Second Embodiment

The combustible gas enrichment system according to the second embodiment differs from the enrichment system according to the first embodiment in that this system includes two adsorption units. In the following explanation of the enrichment system according to the second embodiment, the description of those constituent portions identical to the first embodiment will be omitted.

FIG. 5 is a block diagram for explaining the configuration of the combustible gas enrichment system according to the second embodiment. The enrichment system S2 (S) includes adsorption units U (U1, U2), a blower B as a source gas feeding means, a vacuum pump device P as a suctioning means and a controlling means C. In this enrichment system S2, the constituent portions relating to the adsorption unit U3 are omitted from the above-described enrichment system according to the first embodiment.

The enrichment system S2 includes gas feeding passages (d1) for feeding source gas to the respective adsorption units U1, U2, and gas discharging passages (d2) for discharging

TABLE 4

| | stage | | | | | |
|---|---|---|---|---|---|---|
| | 1 | 2 | 3 | 4 | 5 | 6 |
| rotational speed of drive motor (rpm) | 1100 | 600 | 1100 | 1100 | 600 | 1100 |

The adsorption unit U1 effects an adsorption process in the first, stage, a pressure equalization process in the second stage, a desorption process in the third and fourth stages, a pressure equalization process in the fifth stage and a pressurization process in the sixth stage. As the configurations of the respective adsorption units U1, U2 are all the same, the procedures of the adsorption process, the pressure equalization process, the desorption process, and the pressurization process are substantially the same. That is, the adsorption unit U2 differs from the adsorption unit U1 in the timings of the executions of the respective processes. Therefore, the following explanation will be made mainly on the procedure of the adsorption process, the pressure equalization process, the desorption process, and the pressurization process executed by the adsorption unit U1 in the course of the first through sixth stages and the detailed explanations of the respective processes executed in the adsorption unit U2 will be omitted.

[First Stage]

In the first stage, the controlling means C causes the adsorption unit U1 to execute an adsorption process. Specifically, the controlling means C opens the gas feeding passage switching valve 1 and the gas discharging passage switching valve 3 and closes the gas collecting passage switching valve 2 and the communicating passage switching valve 7. In addition, the controlling means C activates the blower B for feeding the source gas through the gas feeding passage (d1) into the adsorption unit U1 for causing the combustible gas contained in the source gas to be adsorbed to the adsorbent (a) and also causing the offgas which is the portion of the source gas fed into the adsorption unit U1 and not adsorbed to the adsorbent (a), through the discharging passage (d2) to the space outside the adsorption unit U1.

Thereafter, the controlling means C causes the gas sensor 13 to detect whether the concentration of the combustible gas contained in the offgas discharged to the discharging passage (d2) is higher than a predetermined concentration or not. If the detected concentration of the combustible gas is higher than the predetermined concentration, the feeding of the source gas to the adsorption unit U1 is stopped, thereby to complete the adsorption process. Namely, the controlling means interprets the combustible gas concentration detected in the gas discharging passage (d2) being higher than the predetermined concentration as indication of the adsorbent (a) having reached its adsorption limit, then, completes the adsorption process.

[Second Stage]

In the second stage, the controlling means C executes a pressure equalization process for equalizing the inside pressure of the adsorption unit U1 with the inside pressure of the adsorption unit U2. Specifically, the controlling means C opens the communicating passage switching valve 7 incorporated in the communicating passage (d4) communicating between the adsorption unit U1 and the adsorption unit U2 and closes the gas feeding passage switching valve 1, the gas collecting passage switching valve 2 and the gas discharging passage switching valve 3.

At the timing prior to the start of the second stage, the inside pressure of the adsorption unit U1 indicates a relatively high pressure as the pressure immediately after the adsorption process effected in the first stage, whereas the inside pressure of the adsorption unit U2 indicates a relatively low pressure as the pressure immediately after the desorption process effected in the first stage. And, in the second stage, the communicating passage switching valve 7 is opened for effecting the pressure equalization process, with which the inside pressure of the adsorption unit U1 is reduced whereas the inside pressure of the adsorption unit U2 is increased, so that these pressures are equalized to each other. As a result, in the adsorption unit U1, gas containing low-concentration combustible gas not adsorbed to the adsorbent (a) and remaining mainly in the form of gas phase will be diffused toward the adsorption unit U2. Therefore, it is possible to prevent this low-concentration combustible gas from being collected inadvertently toward the product tank T in the third stage subsequent thereto. Further, in the adsorption unit U2, the pressure inside this adsorption unit U2 can be raised to some extent in advance, prior to the pressurization process to be effected later.

In the second stage, the controlling means C causes neither of the adsorption units U (U1, U2) to execute a desorption process, but continuously operates the vacuum pump device P. In this, the controlling means C controls the vacuum pump device P in such a manner that the suction force of the vacuum pump device P when neither of the adsorption units U (U1, U2) are involved in a desorption process may be smaller than the suction force of the vacuum pump device P when a desorption process is effected. In the second stage, as shown in Table 4, the controlling means C controls the rotational speed of the drive motor Pb to 600 rpm.

[Third Though Fourth Stages]

In the third through fourth stages, the controlling means C causes the adsorption unit U1 to execute a desorption process. More particularly, the controlling means C closes the gas feeding passage switching valve 1, the gas discharging passage switching valve 3, and the communicating passage switching valve 7 and opens the gas collecting passage switching valve 2 at the same time. In the third to fourth stage, the controlling means C increases the suction force of the vacuum pump device P (controls the rotational speed of the drive motor Pb to 1100 rpm), thereby to depressurize the inside of the adsorption unit U1 to a sub-atmospheric pressure for desorption of the adsorbed combustible gas from the adsorbent (a). After depressurizing the inside of the adsorption unit U1 to a predetermined pressure, the controlling means C closes the gas collecting passage switching valve 2 in order to stop collection of the combustible gas from the adsorption unit U1.

[Fifth Stage]

In the fifth stage, the controlling means C executes a pressure equalization process for equalizing the inside pressure of the adsorption unit U1 and the inside pressure of the adsorption unit U2. The procedure in the execution of the pressure equalization process in the fifth stage is identical to the procedure in the execution of the pressure equalization process in the second stage.

At the timing prior to the start of the fifth stage, the inside pressure of the adsorption unit U1 indicates a relatively low pressure as the pressure immediately after the desorption process effected in the fourth stage, whereas the inside pressure of the adsorption unit U2 indicates a relatively high pressure as the pressure immediately after the adsorption process effected in the fourth stage. And, in the fifth stage, the communicating passage switching valve 7 is opened for effecting the pressure equalization process, with which the inside pressure of the adsorption unit U1 is increased whereas the inside pressure of the adsorption unit U2 is reduced, so that these pressures are equalized to each other. As a result, in the adsorption unit U1, the pressure inside this adsorption unit U1 can be raised to some extent in advance, prior to the pressurization process to be effected later. Further, in the adsorption unit U2, gas containing low-concentration combustible gas not adsorbed to the adsorbent (a) and remaining mainly in the form of gas phase will be diffused toward the adsorption unit U1.

Like the pressure equalization process in the second stage described above, in the fifth stage, the controlling means C causes neither of the adsorption units U (U1, U2) to execute a desorption process, but continuously operates the vacuum pump device P. In this case, however, like the case of the second stage, the controlling means C controls the vacuum pump device P in such a manner that the suction force of the vacuum pump device P when neither of the adsorption units U (U1, U2) are involved in a desorption process may be smaller than the suction force of the vacuum pump device P when a desorption process is effected. In the fifth stage too, the controlling means C controls the rotational speed of the drive motor Pb to 600 rpm, as shown in Table 4.

[Sixth Stage]

In the sixth stage, the controlling means C causes the adsorption unit U1 to execute a pressurization process. Specifically, the controlling means C opens the gas discharging passage switching valve 3 and closes the gas feeding passage switching valve 1, the gas collecting passage switching valve 2 and the communicating passage switching valve 7. With this, an amount of air (pressurizing gas) is introduced through the gas discharging passage switching valve 3 from the outside into the adsorption unit U1, whereby the pressure of the inside of the adsorption unit U1 is increased to a near-atmospheric pressure, so that adsorption of the combustible gas in the adsorption process to be effected subsequently may be facilitated.

As described above, with the enrichment system S2 according to this embodiment too, in the second stage and the fifth stage, the controlling means C controls the vacuum pump device P in such a manner that the suction force of the vacuum pump device P when neither of the adsorption units U (U1, U2) are involved in a desorption process may be smaller than the suction force of the vacuum pump device P when a desorption process is effected. As a result, in the second stage and the fifth stage, it is possible to avoid unnecessary electric power consumption.

Third Embodiment

The combustible gas enrichment system according to the third embodiment differs from the above-described enrichment system according to the first embodiment in that the system includes a single adsorption unit. In the following explanation of the enrichment system according to the third embodiment, the description of those constituent portions identical to the first embodiment will be omitted.

Figure 6:
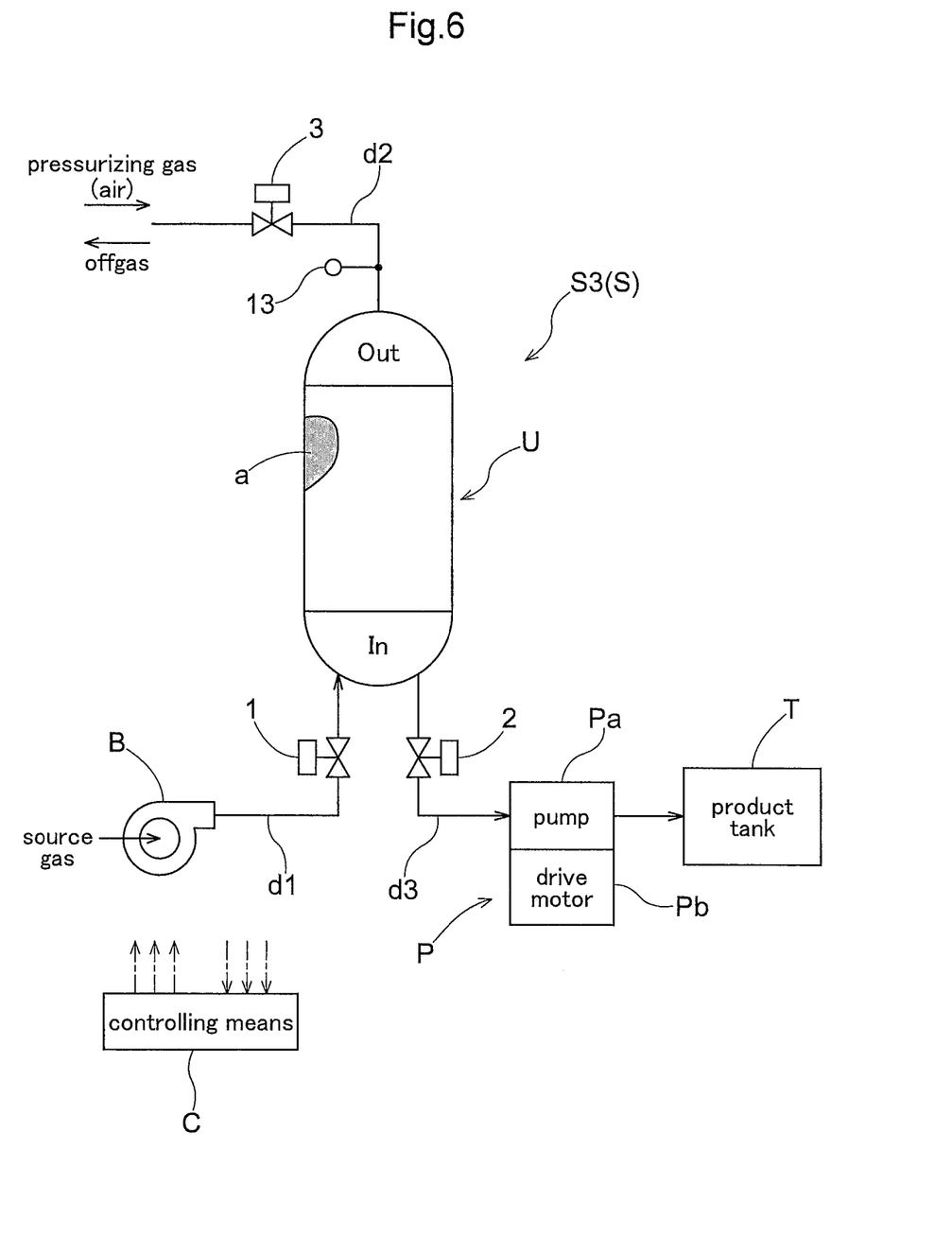
FIG. 6 is a block diagram for explaining the configuration of a combustible gas enrichment system according to a third embodiment.

FIG. 6 is a block diagram for explaining the configuration of the combustible gas enrichment system according to the third embodiment. The enrichment system S3 (S) includes an adsorption unit U, a blower B as a source gas feeding means, a vacuum pump device P as a suctioning means and a controlling means C. In this enrichment system S3, the constituent portions relating to the adsorption unit U2 and the adsorption unit U3 are omitted from the above-described enrichment system according to the first embodiment.

The enrichment system S2 includes a gas feeding passage (d1) for feeding source gas to the adsorption units U1, and a gas discharging passage (d2) for discharging remaining gas (offgas) after adsorption of the combustible gas on the adsorbent (a) with the gas being fed from the gas feeding passages (d1). The gas feeding passage (d1) connected to the adsorption unit U1 incorporates a gas feeding passage switching valve 1. The gas discharging passage (d2) connected to the adsorption unit U1 incorporates a gas discharging passage switching valve 3. Further, the enrichment system S3 includes a gas collecting passage (d3) for collecting product gas from the adsorption unit U1 into a product tank T. The gas collecting passage (d3) connected to the adsorption unit U1 incorporates a gas collecting passage switching valve 2.

Next, the operations of the enrichment system S3 according to the first embodiment will be explained.

The controlling means C, as shown in Table 5 below, executes an adsorption process, a desorption process, a pressure equalization process and a pressurization process for the adsorption unit U1 in the course of the first through third stages.

TABLE 5

| | stage | | |
|---|---|---|---|
| | 1 | 2 | 3 |
| adsorption unit U1 | adsorption | desorption | pressurization |

TABLE 6

| | stage | | |
|---|---|---|---|
| | 1 | 2 | 3 |
| rotational speed of drive motor (rpm) | 600 | 1100 | 600 |

[First Stage]

In the first stage, the controlling means C causes the adsorption unit U1 to execute an adsorption process. Specifically, the controlling means C opens the gas feeding passage switching valve 1 and the gas discharging passage switching valve 3 and closes the gas collecting passage switching valve 2. In addition, the controlling means C activates the blower B for feeding the source gas through the gas feeding passage (d1) into the adsorption unit U1 for causing the combustible gas contained in the source gas to be adsorbed to the adsorbent (a) and also causing the offgas which is the portion of the source gas fed into the adsorption unit U1 and not adsorbed to the adsorbent (a), through the discharging passage (d2) to the space outside the adsorption unit U1.

Thereafter, the controlling means C causes the gas sensor 13 to detect whether the concentration of the combustible gas contained in the offgas discharged to the discharging passage d2 is higher than a predetermined concentration or not. If the detected concentration of the combustible gas is higher than the predetermined concentration, the feeding of the source gas to the adsorption unit U1 is stopped, thereby to complete the adsorption process. Namely, the controlling means interprets the combustible gas concentration detected in the gas discharging passage d2 being higher than the predetermined concentration as indication of the adsorbent (a) having reached its adsorption limit, then, completes the adsorption process.

The controlling means C continues operation of the vacuum pump device P while an adsorption process is being effected. Specifically, the controlling means C controls the vacuum pump device P in such a manner that the suction force of the vacuum pump device P when the adsorption process is effected in the first stage may be smaller than the suction force of the vacuum pump device P when a desorption process is effected. In the instant embodiment, as shown in Table 6, the rotational speed of the drive motor Pb is controlled to 600 rpm.

[Second Stage]

In the second stage, the controlling means C causes the adsorption unit U1 to execute a desorption process. More particularly, the controlling means C closes the gas feeding passage switching valve 1 and the gas discharging passage switching valve 3, and opens the gas collecting passage switching valve 2 at the same time. In the second stage, the controlling means C increases the suction force of the vacuum pump device P (controls the rotational speed of the drive motor Pb to 1100 rpm), thereby to depressurize the inside of the adsorption unit U1 to a sub-atmospheric pressure for desorption of the adsorbed combustible gas from the adsorbent (a). After depressurizing the inside of the adsorption unit U1 to a predetermined pressure, the controlling means C closes the gas collecting passage switching valve 2 in order to stop collection of the combustible gas from the adsorption unit U1.

[Third Stage]

In the third stage, the controlling means C causes the adsorption unit U1 to execute a pressurization process. Specifically, the controlling means C opens the gas discharging passage switching valve 3 and closes the gas feeding passage switching valve 1 and the gas collecting passage switching valve 2. With this, an amount of air (pressurizing gas) is introduced through the gas discharging passage switching valve 3 from the outside into the adsorption unit U1, whereby the pressure of the inside of the adsorption unit U1 is increased to a near-atmospheric pressure, so that adsorption of the combustible gas in the adsorption process to be effected subsequently may be facilitated.

The controlling means C continues operation of the vacuum pump device P while a pressurization process is being effected. Specifically, the controlling means C controls the vacuum pump device P in such a manner that the suction force of the vacuum pump device P when the pressurization process is effected may be smaller than the suction force of the vacuum pump device P when a desorption process is effected. In the instant embodiment, as shown in Table 6, the rotational speed of the drive motor Pb is controlled to 600 rpm.

Other Embodiments

1

In the foregoing embodiments, there were explained the examples where the drive motor Pb of the vacuum pump device P is operated at a fixed rotational speed (1100 rpm) in the course of a desorption process. Instead, the rotational speed of the drive motor Pb may be varied in the course of a desorption process. For instance, the controlling means C may operate the vacuum pump device P in such a manner that the suction force of the vacuum pump device (suctioning means) P at an early stage of a desorption process is greater than the suction force of the vacuum pump device P at a subsequent stage in the desorption process. With execution of such control, it is possible to desorb a great amount of combustible gas from the adsorbent (a) at the early stage in the desorption process and to decrease the energy consumption at the subsequent stage in the desorption process at the same time for efficient desorption of the combustible gas from the adsorbent (a).

2

In the foregoing embodiments, there were explained examples wherein an adsorption process, a desorption process, etc. are executed in the adsorption units U in the orders shown in Table 3 and Table 5. However, in what order an adsorption process, a desorption process, etc. are to be executed in the adsorption units U can vary as desired.

3

In the foregoing embodiments, the configuration of the combustible gas enrichment system S can vary as desired. For instance, a mechanism for persorption may be additionally provided for increasing the amount of combustible gas adsorbed in the adsorption unit U by feeding the source gas to the adsorption unit U at a high pressure by means of a pump or the like.

Further, in the foregoing embodiments, there were explained the examples wherein a single vacuum pump P is provided to be commonly used for the suction of the insides of a plurality of adsorption units. Instead, vacuum pump devices P may be provided respectively for the plurality of adsorption units U.

4

In the foregoing embodiments, there were explained the examples of the enrichment systems having one to three adsorption unit(s) U. Instead, the enrichment system may include more than four adsorption units U.

5

In the foregoing embodiments, there were shown examples of the values of the pressure inside the adsorption unit U, the rotational speed of the drive motor Pb of the vacuum pump device P, etc. However, these values can vary as desired.

INDUSTRIAL APPLICABILITY

The present invention is applicable to a combustible gas enrichment system for feeding a source gas containing a combustible gas and air to an adsorption unit charged therein with an adsorbent for selectively adsorbing the combustible gas for selective adsorption and enrichment of the combustible gas.

| Description of Reference Marks/Numerals | |
|---|---|
| a: | adsorbent |
| B: | blower (source gas feeding means) |
| C: | controlling means |
| P: | vacuum pump device (suctioning means) |
| Pa: | pump |
| Pb: | drive motor |
| S (S1, S2, S3): | combustible gas enrichment system |
| T: | product tank |
| U (U1, U2, U3): | adsorption units |

The invention claimed is:
1. A combustible gas enrichment system comprising:
an adsorption unit charged therein with an adsorbent for selectively adsorbing a combustible gas;
a source gas feeding means capable of feeding source gas containing the combustible gas into the adsorption unit from the outside;
a suctioning means including a pump capable of suctioning the gas from the inside of the adsorption unit and a drive motor for driving the pump; and
a controlling means for executing an adsorption process for feeding the source gas into the adsorption unit by the source gas feeding means for adsorption of the combustible gas to the adsorbent and a desorption process for desorbing the combustible gas from the adsorbent under the suction force of the suctioning means after the adsorption process and taking the desorbed combustible gas to the outside;
wherein for the adsorption process, the controlling means recognizes the concentration of the combustible gas detected in a gas discharging passage of the adsorption unit exceeding a predetermined concentration as indica- tion of the adsorbent reaching its adsorption limit and completes the adsorption process;

for the desorption process, the controlling means monitors the inside pressure of the adsorption unit and completes the desorption process of the adsorption unit when the inside of the adsorption unit is depressurized to a predetermined pressure; and the controlling means adjusts the suction force of the suctioning means by controlling the rotational speed of the drive motor through the inverter control technique such that the suction force of the suctioning means when no desorption process is effected is smaller than the suction force of the suctioning means when the desorption process is effected.

2. The combustible gas enrichment system according to claim 1, wherein the system includes one said adsorption unit; and the controlling means operates the suctioning means such that the suction force of the suctioning means when the adsorption process is effected is smaller than the suction force of the suctioning means when the desorption process is effected.

3. The combustible gas enrichment system according to claim 1, wherein the system includes a plurality of said adsorption units;

said suctioning means is used commonly for suctioning the insides of the plurality of adsorption units; and the controlling means operates the suctioning means such that the suction force of the suctioning means when no adsorption process is effected in any of the adsorption units is smaller than the suction force of the suctioning means when the desorption process is effected.

4. The combustible gas enrichment system according to claim 3, wherein the controlling means is capable of effecting, in addition to the adsorption process and the desorption process, a pressure equalization process for equalizing the pressure inside one of the plurality of adsorption units after execution of the adsorption process therein with the pressure inside a further one of the plurality of adsorption units after execution of the desorption process therein by establishing communication between the inside of the one adsorption unit and the inside of said further adsorption unit via a communicating passage; and the controlling means operates the suctioning means such that the suction force of the suctioning means when the pressure equalization process is effected is smaller than the suction force of the suctioning means when the desorption process is effected.

5. The combustible gas enrichment system according to claim 1, wherein the controlling means operates the suctioning means such that the suction force of the suctioning means at an early stage in the desorption process is greater than the suction force of the suctioning at subsequent stage in the desorption process.

* * * * *